Figure 1:
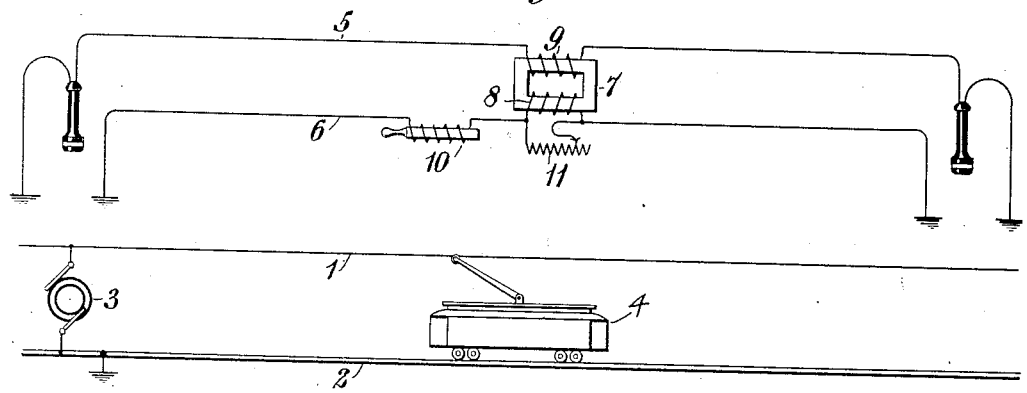

C. F. SCOTT.
MEANS FOR NEUTRALIZING INDUCED DISTURBANCES IN INTELLIGENCE TRANSMISSION CIRCUITS.
APPLICATION FILED JULY 9, 1906.

969,499.

Patented Sept. 6, 1910.

2 SHEETS—SHEET 1.

WITNESSES:
C. L. Belcher
Otto S. Schairer

INVENTOR
Charles F. Scott
BY
Wesley G. Carr
ATTORNEY

C. F. SCOTT.
MEANS FOR NEUTRALIZING INDUCED DISTURBANCES IN INTELLIGENCE TRANSMISSION CIRCUITS.
APPLICATION FILED JULY 9, 1906.

969,499.

Patented Sept. 6, 1910.

2 SHEETS—SHEET 2.

WITNESSES:
C. L. Belcher
Otto J. Schairer

INVENTOR
Charles F. Scott
BY
Wesley G. Carr
ATTORNEY

UNITED STATES PATENT OFFICE.

CHARLES F. SCOTT, OF PITTSBURG, PENNSYLVANIA, ASSIGNOR TO WESTINGHOUSE ELECTRIC & MANUFACTURING COMPANY, A CORPORATION OF PENNSYLVANIA.

MEANS FOR NEUTRALIZING INDUCED DISTURBANCES IN INTELLIGENCE-TRANSMISSION CIRCUITS.

969,499.     Specification of Letters Patent.     Patented Sept. 6, 1910.

Application filed July 9, 1906. Serial No. 325,272.

*To all whom it may concern:*

Be it known that I, CHARLES F. SCOTT, a citizen of the United States, and a resident of Pittsburg, in the county of Allegheny and State of Pennsylvania, have invented a new and useful Improvement in Means for Neutralizing Induced Disturbances in Intelligence-Transmission Circuits, of which the following is a specification.

My invention relates to means for neutralizing and preventing disturbances in electrical circuits that may be caused by other circuits located in proximity thereto, and it is particularly applicable to the protection of telephone, telegraph and other circuits utilized for the transmission of intelligence, that are paralleled, for longer or shorter distances, by circuits utilized for the transmission of power by alternating current.

The object of my invention is to provide means whereby electromotive forces that are induced in, or otherwise impressed upon, an intelligence-transmission circuit by an adjacent power transmission circuit may be neutralized by another equal electromotive force of exactly the opposite phase.

In another system of which I am aware, the electromotive forces that are induced in, or otherwise impressed upon, an intelligence-transmission circuit by an adjacent power-transmission circuit are opposed by other electromotive forces that are similarly induced in an auxiliary circuit that is preferably disposed in close proximity to the intelligence-transmission circuit, the opposition of the electromotive forces being effected by means of a transformer the primary winding of which is placed in the auxiliary circuit and the secondary winding in the intelligence-transmisson circuit. In that system, however, the electromotive force impressed upon the intelligence-transmission circuit by the secondary winding of the transformer may not be exactly opposite in phase to the resultant of the electromotive forces impressed upon the circuit by the adjacent power-transmission system, and, consequently, complete elimination of the disturbances may not be effected.

In exact opposition in phase of the electromotive forces may result from three causes. First, the primary and secondary electromotive forces in the transformer are not exactly opposite in phase. Second, the electromotive force upon the primary of the transformer may differ in phase from that impressed upon the auxiliary circuit because the power factors of the primary winding of the transformer and of the auxiliary circuit may be different. And, third, when the intelligence-transmission and auxiliary circuits are not grounded at the same points, there may be a difference between the phases of the electromotive forces which may be impressed upon the two circuits.

By means of the present invention, the electromotive force impressed upon an intelligence-transmission circuit by the secondary winding of a transformer may be adjusted in phase and may be caused to be exactly opposed in phase to the resultant of the electromotive forces that are derived in any manner whatsoever, from an adjacent power-transmission system.

Figure 2:
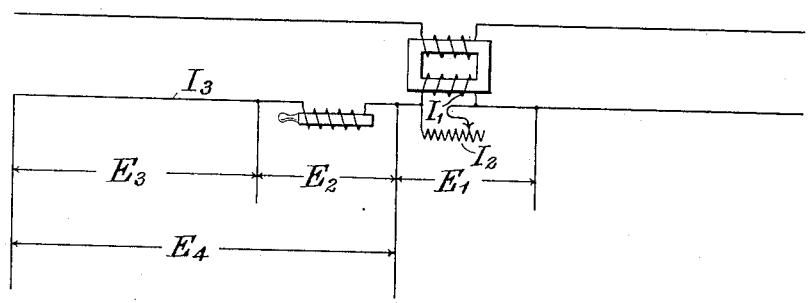
Figure 3:
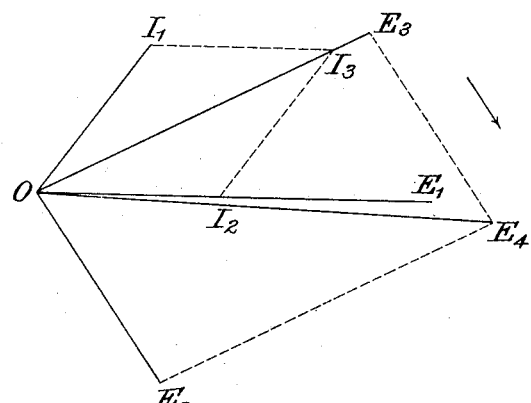
Figure 4:
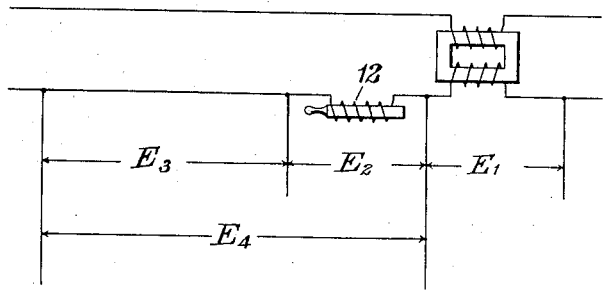
Figure 5:
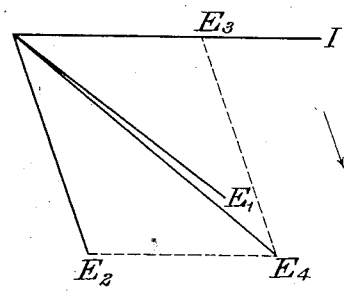
Figure 6:
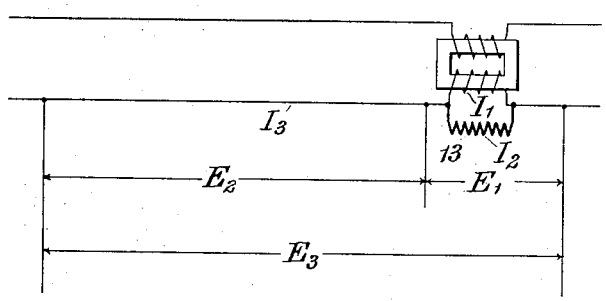
Figure 7:
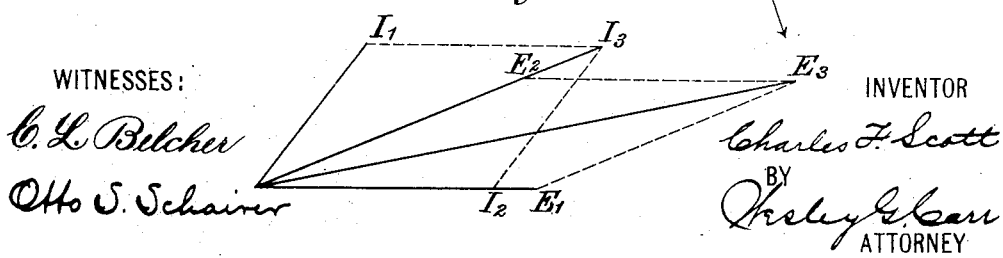

Figure 1 of the accompanying drawing is a diagrammatic view of a system that embodies my invention. Fig. 2 is an enlarged view of a portion of the system of Fig. 1. Fig. 3 is a vector diagram illustrating the phase relations of the currents and electromotive forces of the system. Figs. 4 and 6 are diagrammatic views of modifications of the system of Fig. 1, and Figs. 5 and 7 are vector diagrams for explaining the phase relations of the currents and electromotive forces in Figs. 4 and 6, respectively.

An electric railway system, that may be considered as representative of a suitable power-transmission system, comprises a trolley conductor 1 and a track rail 2 that are supplied with alternating current from any suitable source, such as that shown at 3, and that are adapted to be electrically connected through the circuits of one or more vehicles of the character indicated at 4.

Located in proximity to the railway system, as, for instance, upon poles along or adjacent to the right of way thereof, or at such a distance therefrom as to be within the magnetic field set up thereby, is a conductor 5 of an intelligence-transmission circuit, here shown as a telephone circuit, but which may also be one of the conductors of a telegraph or other suitable circuit, the return portion of which may be the earth, as indicated. The electromotive forces induced in the telephone circuit by the magneto-motive forces set up by the railway or power-transmission circuit are opposed by electromotive forces induced in like manner in an auxiliary circuit having substantially the same location as the telephone circuit, which is shown in Fig. 1, as comprising a conductor 6 and an earth return, the means employed for effecting opposition of the induced electromotive forces comprising a transformer 7 having a primary winding 8 that is connected in series with the auxiliary conductor 6, and a secondary winding 9 that is connected in series with intelligence-transmission conductor 5.

In the preferred embodiment of the invention a variable inductive resistance 10 is connected in series with the auxiliary circuit conductor and a variable ohmic resistance 11, in shunt to the primary winding 8, which devices are employed for effecting phase adjustment of the electromotive forces of the auxiliary circuit in such a manner that the electromotive force applied by the transformer 7 to the telephone circuit will be exactly opposite in phase to the electromotive force induced therein or otherwise impressed thereupon by the power-transmission system.

In order to explain the phase relations of the currents and electromotive forces in the auxiliary circuit, reference characters indicating the two quantities in each portion of the circuit are applied to Fig. 2, in which $E_1$ represents the difference in potential between the terminals of the primary winding 8 of the transformer and of the resistance 11, $E_2$ the difference in potential between the terminals of the inductive resistance 10, $E_3$ the drop in potential over the resistance of the auxiliary circuit, $E_4$ the resultant of electromotive forces $E_2$ and $E_3$; $I_1$ the current in the primary winding 8 of the transformer, $I_2$ the current that traverses the ohmic resistance 11, and $I_3$ the current that traverses the auxiliary circuit conductor 6 and the inductive resistance 10. In Fig. 3 the same reference characters are applied to the vectors which indicate the phase relations and relative amounts of the above quantities in a specific example which has been selected merely to illustrate the mode of operation of the invention.

The current $I_1$ in the primary winding 8 of the transformer 7 lags somewhat behind the electromotive force $E_1$ applied thereto and the current $I_2$ in the ohmic resistance 11 is in phase with the electromotive force $E_1$. The resultant of the currents $I_1$ and $I_2$ is the current $I_3$ that traverses the conductor 6 and the inductive winding 10. The drop in electromotive force $E_3$ over the resistance of the auxiliary circuit (the inductance of this circuit is assumed to be very low) agrees approximately in phase with the current $I_3$ therein, while the drop in electromotive force $E_2$ over the inductive resistance 10 is nearly 90° in phase ahead of the current $I_3$.

The resultant $E_4$ of the electromotive forces $E_2$ and $E_3$ should be of nearly the same phase as the electromotive force $E_1$, in order that the phase of the electromotive force $E_1$ upon the primary of the transformer shall approximate that of the electromotive force impressed upon the auxiliary circuit. As the phase of the secondary electromotive force of the transformer is nearly opposite to that of the primary, therefore the electromotive force impressed upon the telephone circuit by the transformer will be nearly opposite in phase to the resultant of all of the electromotive forces impressed thereon by the power-transmission circuit, if the electromotive forces impressed upon the telephone and the auxiliary circuits by the power-transmission circuit are of the same phase. As a certain range of adjustment can be effected by varying the inductive resistance in shunt to the transformer, it is practicable to secure an exact opposition between the electromotive force impressed upon the telephone circuit by the power-transmission circuit and the electromotive force of the transformer. In the present instance this has been assumed to have been done and the resultant $E_4$ of the electromotive forces $E_2$ and $E_3$ bears such a phase relation to the electromotive force $E_3$ that exact neutralization of the alternating electromotive forces in the telephone circuit is effected.

It will be understood that the disturbing electromotive force in the intelligence-transmission circuit and also that impressed upon the auxiliary circuit may be the resultants of the electromotive forces induced therein by the adjacent power transmission system and those impressed thereupon by differences of potential between their grounded terminals. However, by proper adjustment of the values of the inductive and ohmic resistances, these conditions may also be compensated for in a manner which will be readily understood from the foregoing.

It may be found, in certain instances, that the desired phase relations of the electromotive forces may be obtained by means of an inductive resistance 12 alone, in the auxiliary circuit, in series with the primary winding of the transformer, as indicated in Fig. 4, in which figure, and in Fig. 5 also, the same reference characters have been employed to designate the electromotive forces as previously, and in which the reference character I designates the current. In practice, an inductive resistance alone may be employed to appreciable advantage only when the power factor of the inductive resistance is lower than that of the transformer, and to the best advantage when the resistance of the auxiliary circuit, including that of the primary winding of the transformer, is low, as will be readily understood from an inspection of Fig. 5. Since it is usually desirable to employ as small conductors as practicable in the auxiliary circuit and in the transformer, in order to reduce the expense of installation of the system, this modification may consequently not be found as readily applicable in practice as the foregoing means. The desired phase relations may also be approached by means of a comparatively low resistance 13 (Fig. 6) alone that is connected in shunt to the primary winding of the transformer. The various electromotive forces and currents are designated in Figs. 6 and 7 by similar reference characters to those hereinbefore employed, and will be readily understood. Under the conditions assumed in Fig. 7, it is seen that $E_1$ and $E_3$ are nearly in phase and that they will approach coincidence as the current $I_2$ in the resistance 13 increases.

The means here employed for causing exact opposition and complete neutralization of the electromotive forces in a circuit in which the secondary winding of a transformer is included may be employed for obtaining other desired or predetermined phase relations of the electromotive forces in the secondary circuit and they may be applied in other systems and in other relations than those shown and described without departing from the spirit of the invention.

I claim as my invention:

1. The combination with two electrical circuits that are located within a magnetic field, of a transformer having a primary winding located in one of the circuits and a secondary winding in the other, an ohmic resistance connected in shunt to the primary winding, and an inductive resistance connected in series therewith.

2. The combination with two electrical circuits that are located within a magnetic field, of a transformer having a primary winding located in one of the circuits, and a secondary winding in the other, an ohmic resistance connected in shunt to the primary winding, an inductive resistance connected in series therewith, and means for adjusting the same until the resultant electromotive force in the primary circuit agrees in phase with the electromotive force induced by the magnetic field in the secondary circuit.

3. The combination with two electrical circuits that are located within a magnetic field, of a transformer having a primary winding located in one of the circuits, and a secondary winding in the other, an ohmic resistance connected in shunt to the primary winding, an inductive resistance connected in series therewith, and means for adjusting the same until the resultant electromotive force in the primary circuit agrees in phase with the resultant of the electromotive forces impressed upon the secondary circuit by other means than the transformer.

4. The combination with two electrical circuits that are located within a magnetic field, of a transformer having a primary winding located in one of the circuits and a secondary winding in the other, a variable ohmic resistance connected in shunt to the primary winding, and a variable inductive resistance connected in series therewith.

In testimony whereof, I have hereunto subscribed my name this 29th day of June, 1906.

CHAS. F. SCOTT.

Witnesses:
OTTO S. SCHAIRER,
BIRNEY HINES.